United States Patent
Morselli

(10) Patent No.: US 10,024,317 B2
(45) Date of Patent: Jul. 17, 2018

(54) GEARED HYDRAULIC MACHINE AND RELATIVE GEAR WHEEL

(71) Applicant: DANFOSS POWER SOLUTIONS S.r.l., Reggio Emilia (RE) (IT)

(72) Inventor: Mario Antonio Morselli, Modena (IT)

(73) Assignee: DANFOSS POWER SOLUTIONS S.r.l., Reggio Emilia (RE) (IT)

( * ) Notice: Subject to any disclaimer, the term of this patent is extended or adjusted under 35 U.S.C. 154(b) by 119 days.

(21) Appl. No.: 14/652,586

(22) PCT Filed: Dec. 16, 2013

(86) PCT No.: PCT/IB2013/060997
§ 371 (c)(1),
(2) Date: Jun. 16, 2015

(87) PCT Pub. No.: WO2014/199202
PCT Pub. Date: Dec. 18, 2014

(65) Prior Publication Data
US 2015/0330387 A1  Nov. 19, 2015

(30) Foreign Application Priority Data

Dec. 18, 2012  (IT) .............. MI2012A2168

(51) Int. Cl.
*F04C 2/08*    (2006.01)
*F04C 2/18*    (2006.01)
(Continued)

(52) U.S. Cl.
CPC .............. *F04C 2/084* (2013.01); *F01C 1/082* (2013.01); *F01C 1/084* (2013.01); *F01C 1/18* (2013.01);
(Continued)

(58) Field of Classification Search
CPC .......... F04C 2/084; F04C 2/18; F04C 18/084; F04C 18/18; F04C 2/082; F04C 18/082;
(Continued)

(56) References Cited

U.S. PATENT DOCUMENTS 171,651 A  * 1/1876 Crocker ................ F04C 2/3443
                                                       418/127
294,026 A  * 2/1884 Fitts .......................... G01F 3/10
                                                       418/206.1
(Continued)

FOREIGN PATENT DOCUMENTS

DE          409 657 C     2/1925
DE       27 37 761 A1     3/1979
(Continued)

OTHER PUBLICATIONS

International Search Report and Written Opinion dated Oct. 13, 2014 in PCT/IB2013/060997.
(Continued)

*Primary Examiner* — Mark Laurenzi
*Assistant Examiner* — Xiaoting Hu
(74) *Attorney, Agent, or Firm* — Oblon, McClelland, Maier & Neustadt, L.L.P.

(57) ABSTRACT

A gear wheel for gear pumps/motors including a plurality of asymmetrical teeth, each tooth including a driving side with a convex shape and mating with a corresponding convex side of a counter-wheel and a discharge side defined, in most of its length, as a cavity of a convex profile. The discharge side is configured so that the radius passing through a tip of the teeth is substantially at least tangent to the discharge side, or intersects the discharge side.

14 Claims, 3 Drawing Sheets

(51) Int. Cl.
*F04C 18/08* (2006.01)
*F04C 18/18* (2006.01)
*F01C 1/08* (2006.01)
*F01C 1/18* (2006.01)
*F16H 55/08* (2006.01)

(52) U.S. Cl.
CPC ................ *F04C 2/082* (2013.01); *F04C 2/18* (2013.01); *F04C 18/082* (2013.01); *F04C 18/084* (2013.01); *F04C 18/18* (2013.01); *F16H 55/0806* (2013.01)

(58) Field of Classification Search
CPC .. F01C 1/084; F01C 1/18; F01C 1/082; F16H 55/0806
USPC ............................ 418/206.5, 206.1, 189, 190
See application file for complete search history.

(56) References Cited

U.S. PATENT DOCUMENTS

| | | | | |
|---|---|---|---|---|
| 295,597 | A * | 3/1884 | Troutman | F04C 2/18 418/206.5 |
| 3,439,625 | A * | 4/1969 | Warne | F04C 2/084 418/190 |
| 3,817,117 | A * | 6/1974 | Kita | F04C 2/084 74/462 |
| 4,350,480 | A | 9/1982 | Bammert | |
| 5,454,702 | A * | 10/1995 | Weidhass | F04C 2/084 418/171 |
| 6,123,533 | A * | 9/2000 | McBurnett | F04C 2/084 418/191 |
| 2005/0276714 | A1* | 12/2005 | Klassen | F04C 2/084 418/206.5 |
| 2006/0204394 | A1 | 9/2006 | Klassen | |
| 2007/0050066 | A1 | 3/2007 | Chung et al. | |
| 2009/0123316 | A1 | 5/2009 | Klassen | |

FOREIGN PATENT DOCUMENTS

| | | |
|---|---|---|
| GB | 2 012 876 A | 8/1979 |
| GB | 2 045 355 A | 10/1980 |
| RU | 2141578 | 10/1998 |
| WO | WO 03/102420 A1 | 12/2003 |
| WO | 2007/013138 A1 | 2/2007 |

OTHER PUBLICATIONS

Office Action dated Jul. 11, 2017 in Russian Application No. 2015124335/06 with English language translation.

* cited by examiner

GEARED HYDRAULIC MACHINE AND RELATIVE GEAR WHEEL

The present invention refers to gear pumps/motors.

It is known that a gear pump, suitable for pumping pressurised fluid when set in rotation by a motor, can operate as a motor, when its discharge is connected to a pressurised fluid source. Generally speaking, therefore, a pump structure is suitable for operating as a motor, with the adaptations of configuration of the secondary components that are known to the man skilled in the art.

In the rest of this description we will, for the sake of brevity, use the term "gear pump" to indicate a device also suitable for operating as "gear motor", and it can be defined as such, and so by the expression "pump" we mean "pump/motor".

In particular, the present invention refers to a gear pump provided with two gear wheels engaged with each other to transfer a fluid, usually oil.

Currently, on the market there are many different types of gear pumps, which differ from one another basically in the configuration of the teeth of the relative gear wheels.

As an example we can quote pumps with straight teeth, pumps with helical teeth and pumps with asymmetrical teeth.

In general, since gear pumps transfer the fluid through successive isolated low-volume stages thereof, the instantaneous flow rate, and therefore the pressure, has a discontinuous profile over time.

Such a discontinuous or pulsating profile of the pressure, known as "pressure-ripple" or simply "ripple", affects the noisiness of the pump in operation.

Various studies carried out on this phenomenon have found that by decreasing the "ripple", corresponding decreases in noisiness of the pump are obtained.

In general, it can be stated that the simplest, most cost-effective pump that requires the least operating precision is the gear pump with straight gears having single contact.

However, against such an economic advantage, such pumps with straight teeth are noisier than the other types of pumps mentioned above.

In order to reduce the "ripple", and therefore the noise, of a gear pump with straight gears it is necessary to increase the number of teeth of the gear wheels or increase their height. There is also a (rather controversial) solution known as "double contact" in which by placing both sides of the teeth in contact with a clearance tending to zero, a good result is obtained in terms of ripple. Obtaining engagement with "zero" clearance or tending to "zero" is obviously very problematic in terms of operating precision and in practice these pumps last a limited amount of time and produce a noise caused by forcing the engagement in this way that makes the pump very sensitive to any toothing error.

However, with the current state of the art, the simple increase in number of teeth requires that their height be reduced to respect the proportion of the normal module, where normal module=pitch diameter/number of teeth.

However, since this reduction in height has the negative effect of reducing the specific capacity of the pump, the simple increase in the number of teeth with conventional symmetrical configuration does not currently offer a valid solution to the problem of decreasing noisiness.

On the other hand, it is not possible to increase the height of the tooth at will, because we come up against, on the one hand the pointed tooth limit, and on the other hand the limit of under-etching at the foot.

Therefore, such a solution currently proposed is also not advantageous.

Starting from such a problem that has not been solved in an effective manner, the Applicant has sought a new and innovative functional solution that is able to reduce the noisiness of gear pumps, in particular with straight teeth or with a small helix angle, substantially increasing the number of teeth without correspondingly having to reduce the height of the tooth and, consequently, decrease the flow rate of the pump while also maintaining, or even increasing, the specific flow rate of the pump (flow rate/gear volume) which is proportional to the height of the tooth and to the interpenetration of the gear wheels.

The purpose of the present invention is to make a pump that for the same bulk and height of the teeth, with respect to the wheels of the prior art of similar flow rate, has a greater number of teeth and, consequently, is less noisy.

Another purpose of the invention is to achieve a reduction of the ripple in a particularly cost-effective manner, thus without having to force the precision of the toothing (as would happen in double contact pumps) or foresee complex and expensive axial balancing systems of the forces (as becomes necessary in pumps with substantial helix angle).

A further purpose of the invention is to provide a pump that, for the same bulk with respect to a conventional pump, allows a higher specific flow rate to be obtained, allowing a greater height of the teeth and at the same time greater interpenetration of the gear wheels, the characteristics upon which the flow rate depends, as known.

These purposes according to the present invention are accomplished by making a pump as defined in claim 1. Further characteristics of a pump according to the invention are highlighted by the dependent claims.

The characteristics and advantages of a gear according to the present invention will become clearer from the following description, given as an example and not for limiting purposes, referring to the attached schematic drawings, in which.

As will be seen in the following description, the pump of the present invention has differences in configuration with respect to a similar known pump with straight teeth, resulting in important technical effects on its operating characteristics.

Figure 2:
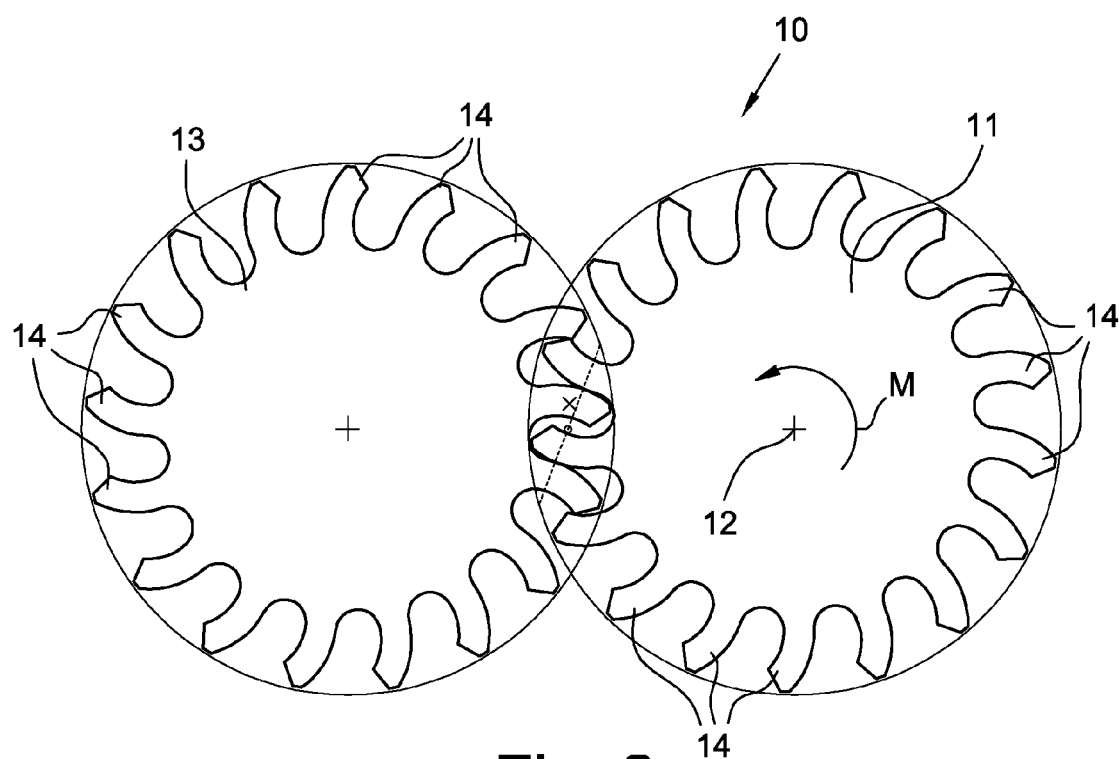
FIG. 2 shows a gear wheel for pumps according to the present invention.

With reference to FIG. 2, the pump 10 of the present invention will be exemplified in just the two gear wheels 11 and 13, the remaining constructive portions of the pump being per se known.

As known, a gear wheel 11 is of the type activated in rotation M around its own centre 12 to set in rotation a corresponding idly engaged wheel 13.

Figure 1:
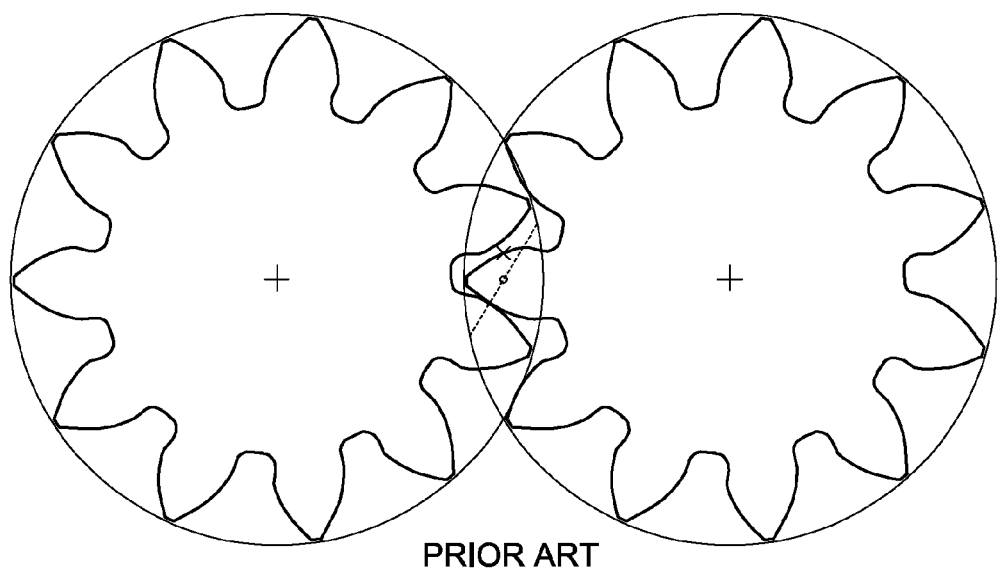
FIG. 1 shows a gear wheel for pumps according to the prior art.

In order to better clarify the inventive concept that forms the basis of the invention it is worth taking into consideration a known wheel with straight teeth for a pump as shown in FIG. 1.

As is clear from the comparison between FIGS. 1 and 2, the gear wheels according to the invention have a greater number of teeth 14, for the same bulk and height of the tooth.

The two gear wheels, in the pump object of the invention, have the same or substantially similar number of teeth.

Figure 3:
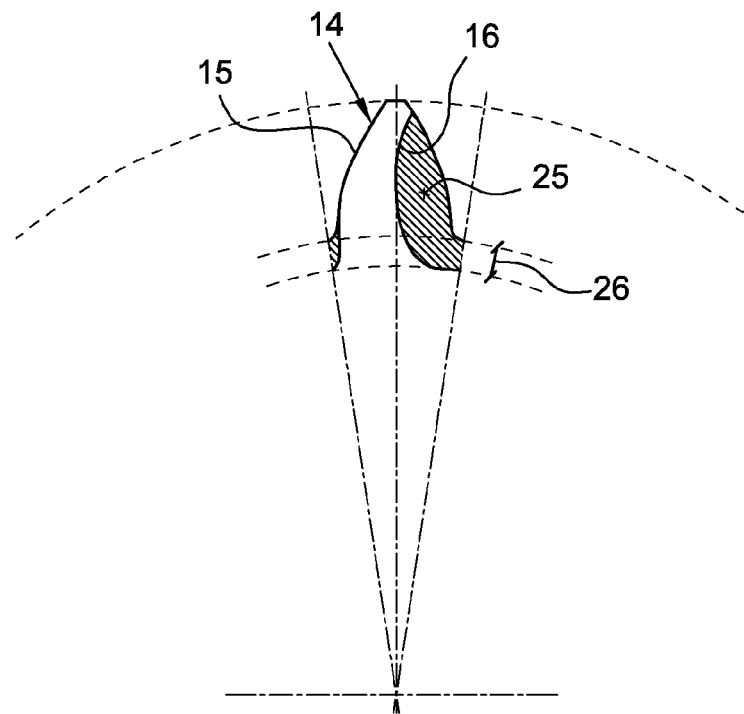
FIG. 3 shows a comparison between a tooth of a known wheel and that of a wheel according to the present invention.

With reference to FIG. 3, it can be seen that the "work" sides 15 of the teeth 14 of each wheel 11 and 13, i.e. the sides 15 that rest on the corresponding sides 15 of the teeth 14 of the wheel with the first engaged, keep their typical per se known mating profile, for example as an involute.

The opposite "discharge" sides 16 of the same teeth 14, on the other hand, have a lowered profile with respect to the configuration that they would have in symmetrical teeth.

In particular, according to the invention, the reduction 25 of the profile of the tooth 14 with respect to the mating profile makes the teeth not only asymmetrical but also not mating one another along the discharge sides 16. Only the convex end part of the "discharge" side towards the head can match up with the concave part that is located towards the bottom of the counter-wheel. It is clear from the drawing how the convex part towards the head has a much smaller length than the concave part towards the bottom. For this reason, it can be seen how the discharge profile has two distinct sections, a convex one and a concave one.

The convex section is of limited length and could also be of zero length, making the tooth finish with a sharp edge, although a small convex portion is useful both in the size control step during production and in the running in step of the pump making the stress of the tooth on the containment box more controllable, the concave section is longer and, from the end of the convex portion reaches up to the bottom with a large radius. As can be seen from the figures, the convex portion of the discharge side is located completely outside the pitch circle, being able to be reduced up to tending to zero.

Figure 4:
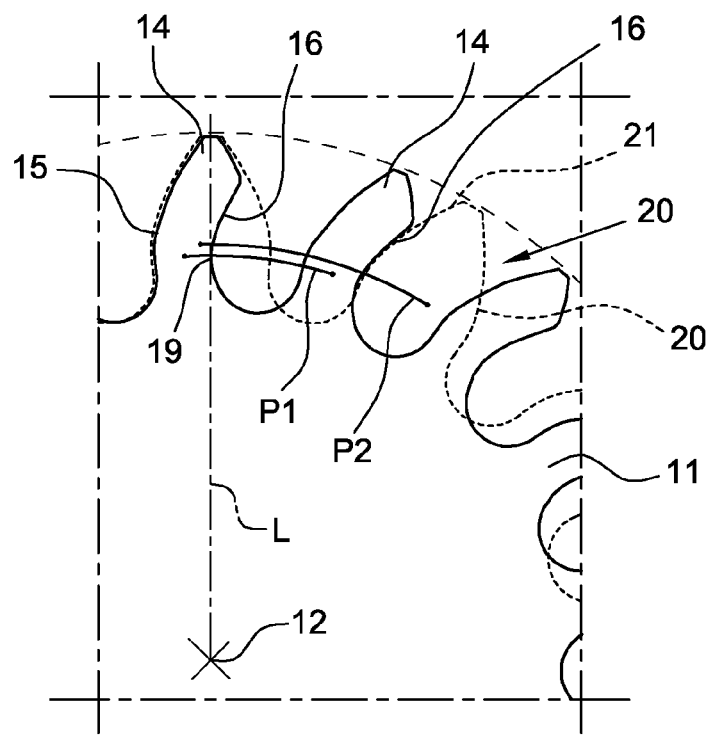
FIG. 4 shows the difference in pitch between the teeth of a known wheel and those of the present invention.

It can be seen from FIG. 4 how, preferably, the bottom of tooth curves have very large bending radii. In the most common case where the bottom of tooth curves are trochoids generated by mills or screw grinders (enveloping hobs) having spoked heads forming arcs of circumference, these tool head spokes are preferably of the order of 0.5-0.7 modules, typically 0.5, against the usual values that are between 0.2 and 0.3 modules. This characteristic is suitable particularly for a structural problem: the teeth of the finding are thinner than in known toothings, and therefore they must be densely spoked to decrease the etching effect and improve their resistance to bending, a condition that is necessary in order to be able to operate even at high pressure. The purely geometric proportioning of the engagement is also favourably affected by this choice.

Therefore, in general terms, the invention foresees to adopt a wheel, typically but not necessarily with straight teeth, in which such asymmetrical teeth have discharge sides 16 generally not matching (or matching in the way described above, the convex portion 16a with the concave portion 16b of the counter-wheel) and greatly recessed with respect to a mating profile.

As shown in FIG. 3 it can also be foreseen to have a further lowering or cavity 26 of the throat of the teeth 14 both at the base of the work side 15 and at the base of the discharge side 16.

As is clear, such lowering or cavity 26 of the throat increases the height of the tooth.

Making asymmetrical teeth 14 and, more specifically, the possibility of foreseeing a lowering or cavity 25 of the tooth 14 along the discharge side 16, is per se already known.

Indeed, wheels for gear pumps for liquids with teeth in which recesses are formed in the discharge side are per se known.

For example, document U.S. Pat. No. 6,123,533 indeed describes a gear pump where each gear wheel has teeth sized in the usual way in terms of height and pitch, and a portion of the tooth is removed along the discharge side in order to increase the volume of fluid trapped between the teeth.

Similarly, document GB2012876 illustrates a gear pump in which the discharge side has recesses in order to increase the volume of liquid between the teeth and avoid cavitation phenomena, in particular in the pumping of volatile fluids like fuels.

Document DE2737761 shows wheels for a gear pump having the discharge side with recesses, to avoid phenomena of excess pressure being created in the engagement area of the wheels, in order to allow higher rotation speeds of the pump.

According to the Applicant's knowledge, in this prior art the configuration with recesses of the discharge side of the tooth worsens the efficiency of the pump.

Teeth with recesses are thus present in the volumetric counter shown in U.S. Pat. No. 294,026, where the minimum power transfer is required between the fluid and the gear wheels.

In these solutions of the prior art there is no suggestion of using the recessed configuration of the discharge side of the tooth in order to increase the number of teeth.

The prior art concerning geared machines is ignored here, where there are none of the problems tackled by the present invention and the man skilled in the art cannot therefore obtain useful teachings from it.

According to the invention, the removal of the volume 25 of the discharge side 16 of the tooth 14, which is not required to be matching, is not used to increase the volume of fluid trapped between the teeth but is used to reduce the pitch between the teeth 14.

Schematic FIG. 4 shows precisely how thanks to the reduction 25 of the discharge side 16 of the tooth 14 the pitch P1 can be substantially reduced, without compromising the operation of the pump, with respect to the pitch P2 foreseen for a known wheel with the same tooth height.

Having reduced the pitch, the number of teeth is thus increased.

Indeed, let us consider a conventional toothing that foresees the formation of the maximum number of symmetrical teeth with mating profiles with pitch line of predetermined diameter. This sizing of the tooth leads to a configuration thereof that is substantially pointed, represented in FIG. 4 by the broken line 20, where the mating side, suitable for resting on the side of the tooth of a corresponding wheel of the pump is indicated with 21. The profile of the discharge side of the tooth 20 is shown with 22.

Together with this tooth profile according to the prior art, the drawing represents, juxtaposed in a solid line, a series of teeth 14 according to the invention.

The profile of the mating side 15 of the tooth 14 consists of the profile of a tooth 14 of height that would be excessive to have a symmetrical profile. In the case of maximum height, the profiles of the two sides would make such a tooth pointed, if with symmetrical profile As shown in FIG. 4, for the same diameter of the wheel and for the same height of the tooth, a wheel that has 12 teeth of conventional configuration can, according to the invention, have a toothing of 17 teeth.

The pitch P1 in a wheel according to the invention is less than 0.9 times the pitch P2 in a wheel of conventional configuration with equal diameter and height of tooth, preferably less than 0.8 times and even more preferably around 0.7 times.

As described earlier, the discharge side 16 of the toothing is made starting from the top of the mating profile 15, with concave profile, recessed by removal of material.

From a geometric point of view, the cavity 25 of the discharge side 16 is made so that the radius L that passes through the extreme point of the tooth is substantially tangent to the profile of the side 16.

The tooth has an extreme portion thereof not in the form of a sharp edge, but that extends in the form of a small circumferential face, both for constructive reasons, and to make an effective seal with respect to the seat in which the wheel is received. Here the radius L should be taken as the radius that passes through the mid-point of the face that makes up the tip of the tooth.

The tip of the tooth of each wheel must not interfere or come into contact with the tooth of the other wheel to avoid a double contact between the toothings of the two wheels and to promote a secure sealed contact between the work sides of the teeth of the two wheels.

In particular, such a radius L can be slightly inside the discharge side 16 or it can be tangent in one point to the discharge side 16, or it can intersect it in two points 17, 18 thus identifying a short portion actually outside the tooth 14.

Figure 5:
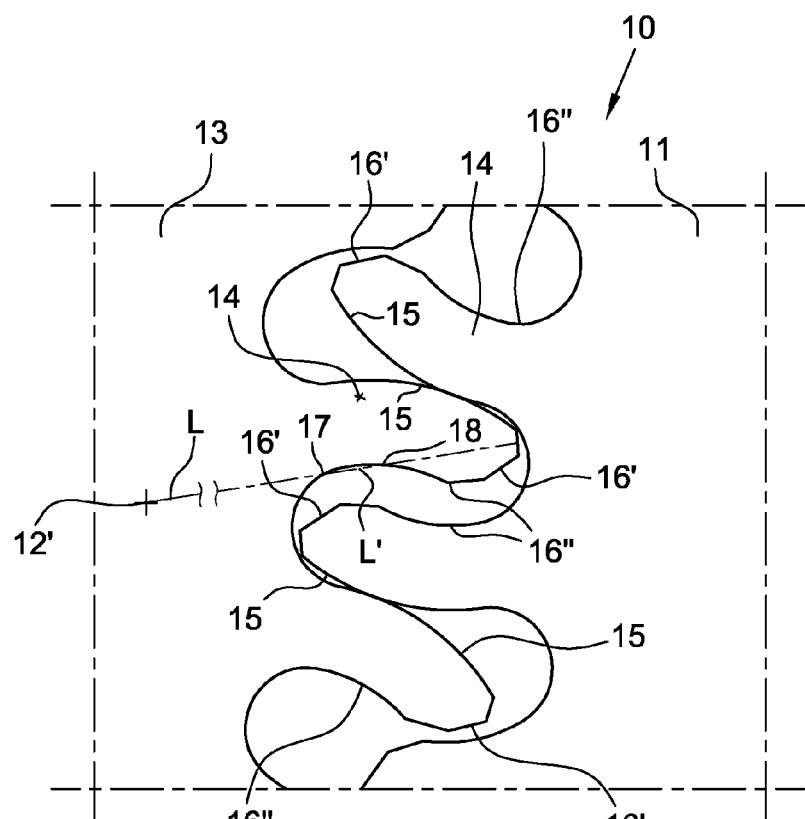
FIG. 5 shows an enlarged detail of two wheels according to the present invention.

This condition is shown in FIG. 5 and further represents the difference between what happens in the prior art, where the radius passing through the vertex of the tooth is completely and substantially, even in the case of asymmetrical toothing, inside the relative tooth.

In the detail of the embodiment shown in FIG. 5, the discharge side 16 comprises a first pointed portion 16' mating with the corresponding tooth of the facing wheel, and a second connecting section 16" with the throat not mating with the corresponding tooth of the facing wheel.

Preferably, such a second connecting section 16" of the discharge side 16 has a concavity facing in the same direction with respect to the driving side 15.

Even more advantageously, the second connecting section 16" of the discharge side 16 is substantially parallel to the driving side 15.

The portion 16' has a profile that can be selected as an involute, i.e. substantially close to the profile that would make a tooth of conventional configuration, or it can differ from such a shape, for example with arc of circle shaped profile.

Between the portions 16' and 16" there can be a short connecting section of variable configuration, also for constructive needs, without substantially influencing the performance of the pump.

According to such a last embodiment it could even be said that the tooth 14 is actually collapsed just in the work side 15 that in any case defines a tooth thickness sized to withstand the mechanical stresses that develop during use of the pump, also for high pressures.

As can be clearly seen in FIG. 4, the tooth configuration made according to the invention, in which the pitch of the teeth P1 is around 0.7 P2 (in any case equal to or less than 0.9 P2, preferably less than 0.8 P2), leads to a profile of the discharge side that is recessed to substantially coincide in its concave part 16" with the profile of the work side that would be possessed by a tooth of a conventional wheel of equal diameter and tooth height.

Figure 6:
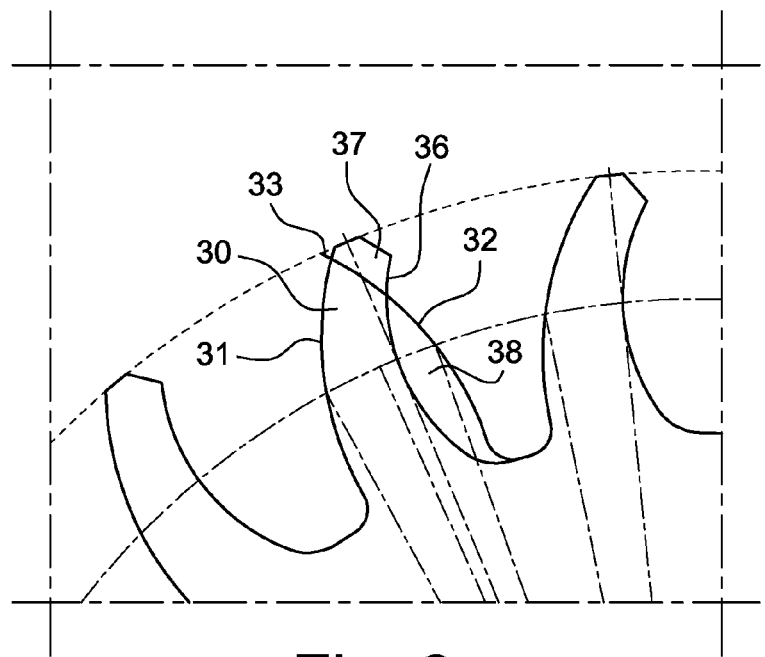
FIG. 6 shows another comparison of a tooth of a known wheel and of a tooth according to the invention.

The surprising results that are achieved by the invention with reference to the height and pitch of the teeth can, also be illustrated with reference to FIG. 6. Usually, geared pumps with straight teeth for high performance and pressure can have a number of teeth between 9 and 12, this innovative geometry makes it possible, at one extreme, to adopt almost double the number of teeth for the same specific capacity, drastically lowering the pressure ripple, or at the other extreme to adopt similar numbers of teeth with a specific capacity increased by almost 50%, allowing, quite logically, all the intermediate choices.

In all cases, whether the number of teeth is increased for equal height of the tooth, or whether the height of the tooth increases for the same number of teeth, or whether an intermediate choice is made, as well known from the equations that describe the engagement, a drastic increase in the transversal covering coefficient is obtained which, as well known, has a favourable effect on mechanical noise, which is reduced.

Reference numeral 30 indicates a tooth having both sides mating, configured according to the current technique.

As can be seen, the profile of the side 31 intersects the profile of the side 32 in the point 33, hence determining the maximum theoretical admissible height for the tooth.

Since the completely pointed shape of the profile of the tooth is not acceptable, in practice the maximum height of the tooth will still be substantially less.

According to the invention, the need to configure the discharge side of the tooth according to a mating profile is completely abandoned.

In this way, a tooth according to the invention can have an active side that follows the theoretical mating profile 31 even beyond the point 33, thus determining a greater height of the tooth.

The discharge side of the tooth according to the invention will have the profile indicated with 36, which determines a tooth portion 37 that can be present where the presence of material of a symmetrical tooth would not be allowed, whereas it will be absent in the portion 38 that is allowed in a tooth with symmetrical profile but it is not present in the toothing according to the invention, in order to avoid interference between the engaged toothings.

The purpose of obtaining greater interpenetration of the toothing, or of making the gears work with smaller distance between centres and pitch diameters, also increasing the number of teeth, with reduction of the circular pitch line is thus achieved.

It can be seen from the above description that the tooth according to the invention with asymmetrical sides has the discharge side with profile far from the mating profile, tendentially concave, but it is permissible for it to be substantially rectilinear.

The "local" pressure angle of the discharge side will be tendentially negative, to reach a maximum of about 1-2.5°.

The circular thickness of the tooth is essentially virtual: indeed, the calculation of the circular thickness, resulting from the expression "line pitch circumference/number of teeth/2", leads to a value that does not affect the material thickness of the tooth (which is substantially less) and nor the thickness that the tooth will have, if it was completed (which would be substantially greater, also for minimum pressure angles).

The height of the tooth interpenetrating in engagement, if parameterised to the real module, is exorbitant with respect to the parameter used in the current technique.

Once the real module has been defined as operating pitch diameter/number of teeth, in gears for pumps in the prior art a difference is found between diameter and distance between centres (tooth height in interpenetration)/real module equal to about 2-2.2; in the geometry resulting from the invention for this parameter there is a value of the order of 3-3.5).

As a result the local pressure angle of the discharge side in its concave or rectilinear part is preferably less than 5°, even more preferably less than 2.5° and preferably negative.

Wheels that are particularly advantageous in terms of ripple, configured according to the invention, have a number of teeth comprised in the range between 15 and 23 teeth, even more preferably in the range between 16 and 22 teeth, even more preferably in the range between 17 and 21 teeth.

It has thus been seen that a geared pump according to the present invention achieves the purposes outlined earlier.

Indeed, such a pump, for the same bulk, without worsening the functionality of the pump, has a greater number of teeth and, therefore, is less noisy due to the "ripple" phenomenon.

Furthermore, the increase in number of teeth not only does not correspond to a decrease in height of the teeth and their interpenetration, but on the contrary actually corresponds to an increase thereof.

The pump of the present invention thus conceived can undergo numerous modifications and variants, all of which are covered by the same inventive concept; moreover, all of the details can be replaced by technically equivalent elements. In practice, the materials used, as well as their sizes, can be whatever according to the technical requirements.

The configuration of the teeth according to the invention is particularly suitable for gears with straight teeth, but it can also be adopted in gears with helical teeth, in particular with a low helix angle.

As stated above, the advantages obtained according to the invention are also achieved with the use of the device indicated above as "pump", also when the device is used as "motor", in particular in terms of the volume of fluid transferred, the reduction of ripple and the quietness of operation determined by the relatively large number of teeth.

The invention claimed is:

1. A gear wheel for gear pumps or motors, comprising: a plurality of asymmetrical teeth with each tooth comprising a driving side with a convex shape and mating with a corresponding convex side of a counter-wheel and a discharge side including a cavity having a concave profile along most of a length of the discharge side and a convex profile along a remainder of the length of the discharge side,
wherein the discharge side is configured so that a radius passing through a tip of the teeth is substantially tangent to the discharge side, or intersects the discharge side,
a pitch between the asymmetrical teeth is substantially $7/10$ of a pitch between symmetrical teeth with involute having sides with a peripheral profile identical to a peripheral profile of the driving side of the asymmetrical teeth, the symmetrical teeth having the same diameter and tooth height as the gear wheel comprising the plurality of asymmetrical teeth, and
the peripheral profile of the asymmetrical teeth is identical to the peripheral profile of the symmetrical teeth on both the discharge side and the driving side except along the cavity.

2. The gear wheel according to claim 1, wherein the radius intersects the discharge side in two points defining a section outside the tooth.

3. The gear wheel according to claim 1, wherein the concave profile faces a same direction with respect to the driving side.

4. The gear wheel according to claim 1, wherein the concave profile of the discharge side is substantially parallel to the driving side.

5. The gear wheel according to claim 1, wherein the concave profile of the cavity is shaped to match the convex shape of the driving side.

6. A gear pump or motor comprising:
a first gear driving wheel activated in rotation around its own axis and a second gear driven wheel engaged with the first gear wheel, each of the gear wheels comprising a plurality of asymmetrical teeth;
each tooth of the wheels comprising a driving side and a discharge side, the driving side and discharge side of each tooth being asymmetrical with respect to each other, the driving sides of corresponding teeth of the wheels each having a convex shape and mating with each other, the discharge side including a cavity having a concave profile along most of a length of the discharge side and a convex profile along a remainder of the length of the discharge side,
the discharge sides of the teeth of the wheels not mating with each other,
wherein the discharge side is configured so that a radius passing through a tip of the teeth is substantially tangent to the discharge side or intersects the discharge side,
a pitch between the asymmetrical teeth is substantially $7/10$ of a pitch between symmetrical teeth with involute having sides with a peripheral profile identical to a peripheral profile of the driving side of the asymmetrical teeth, the symmetrical teeth having the same diameter and tooth height as the gear wheels comprising the plurality of asymmetrical teeth, and
the peripheral profile of the asymmetrical teeth is identical to the peripheral profile of the symmetrical teeth on both the discharge side and the driving side except along the cavity.

7. The gear pump or motor according to claim 6, wherein the radius intersects the discharge side in two points defining a section outside the tooth.

8. The gear pump or motor according to claim 6, wherein the discharge side comprises a first conjugated tip section and a second non-conjugated connecting section with a throat of the tooth.

9. The gear pump or motor according to claim 8, wherein the concave profile faces a same direction with respect to the driving side.

10. The gear pump or motor according to claim 9, wherein the second connecting section of the discharge side comprises the cavity having the concave profile, and the concave profile is substantially parallel to the driving side.

11. The gear pump or motor according to claim 6, wherein the convex profile of the discharge side is located towards a head of the tooth and conjugated in the driven wheel with a portion of the concave profile which connects the convex profile of the discharge side of the driven wheel with a bottom of the tooth.

12. The gear pump or motor according to claim 6, wherein the convex profile of the discharge side is located towards a head of the tooth, the concave profile connects the convex profile of the discharge side with a bottom of the tooth, and the concave profile extends outside a pitch circle.

13. The gear pump or motor according to claim 12, wherein the convex profile does not have a mating shape as far as a head of the tooth, forming a section of profile towards the head of the tooth that is not conjugated with a profile of the driven wheel, but serves only for increasing external diameter, interpenetration of the wheels, and therefore specific capacity, at a same time reducing ripple.

14. The gear pump or motor according to claim 6, wherein the concave profile of the cavity is shaped to match the convex shape of the driving side.

\* \* \* \* \*